Patented Sept. 19, 1939

2,173,445

UNITED STATES PATENT OFFICE 2,173,445

PIGMENTED BASE FOR COATING COMPOSITIONS

Robert Louis Zapp, Easton, Pa., assignor to Binney and Smith Company, New York, N. Y., a corporation of New Jersey No Drawing. Application August 4, 1937, Serial No. 157,447

8 Claims. (Cl. 134—79)

This invention relates to the preparation of pigmented bases serving as an intermediate product in the manufacture of coating compositions, such as paints, varnishes, lacquers, enamels, inks, plastics and the like. An important object of the invention is to obtain a more thorough and permanent dispersion of a pigment within a dispersion medium composed in whole or in part of a cellulose ether.

More specifically the invention aims to provide a method for improving the dispersion of a pigment within a cellulose ether dispersion medium by incorporating in said medium, together with the pigment, a salt of calcium, barium or strontium, which is soluble in the cellulose ether dispersing medium, and more particularly such soluble metal salts of the fatty-acids. I have found that the above-mentioned metal salts which are soluble in the cellulose ether pigmenting medium actively promote the dispersion of the pigment— which may be either carbon black or some other suitable pigment—and result in the production of a base from which coating compositions characterized by their stability, high lustre, depth of color and permanency may readily be derived by mixing with a suitable solvent.

In the preparation of the cellulose ether pigmented base in accordance with the invention, I may advantageously employ the two-step process of mechanical dispersion disclosed in the patent of William B. Wiegand, No. 2,045,006, dated June 23, 1936. Following the procedure of this patent the dispersion medium, a cellulose ether or a mixture including a celulose ether as a principal ingredient, is coalesced with a plasticizer, a pigment—for example, carbon black—and an organic acid salt of calcium, barium or strontium which is soluble in the dispersing medium. This coalescing or massing action is conducted under conditions most favorable to ready mixing and either with or without the application of high shearing stresses. The amount of plasticizer is so chosen as to coalesce the cellulose ether without rendering the latter softly plastic. In the second step of the process the mass resulting from the initial treatment is subjected to unusually high shearing stresses—such as are attained by passing it between closely set pressure rolls of the type commonly used in the rubber industry—while in a state of unusually stiff consistency.

The metal salt, which may be regarded as a dispersing agent and which is soluble in the pigmenting medium, may be incorporated at any stage prior to or during the colloidal dispersing of the pigment in the medium and the amount of this salt is preferably between one and twenty percent based upon the weight of pigment. When color pigments other than carbon black are used, their specific volumes are somewhat less and the proportion of the metal salt dispersing agent when used with such color pigments will also usually be smaller. Although generally those salts of calcium, barium and strontium which are soluble in the cellulose ether dispersion medium will function satisfactorily, it has been found that the salts of the long-chain aliphatic acids, preferably containing eight or more carbon atoms, produce the most beneficial results. The oleates of these metals, and especially of barium and strontium, are the preferred compounds. The calcium, barium and strontium salts of the aromatic acids, such as the salicylates, are operative but function somewhat less effectively than those of the acylic acids. On the other hand, the closely related magnesium compounds do not produce the unusual beneficial effects such as are attained by the soluble salts of calcium, barium and strontium.

In order to make the invention more clear the following illustrative examples of modes of manufacturing cellulose ether pigmented bases are given. In these examples the cellulose ether is to be regarded as the dispersing medium.

A pigmented base composed of the following materials in the proportions named may be regarded as typical of the invention.

*Example I*

| | Parts by weight |
|---|---|
| Ethyl cellulose "B"—low viscosity (18 centipoises) | 100 |
| Carbon black | 50 |
| Dibutyl phthalate | 10 |
| Calcium palmitate | 5 |
| Xylene | 39 |

The carbon black pigment is wet down with the xylene and then massed with the other ingredients in a mixing machine of the dough mixer type.

In this machine the materials occupying the mixer bowl are thoroughly agitated by blades or paddles which revolve within the bowl and stir the materials into a plastic mass. In order to obtain a more complete and thorough massing of the ingredients, batches of the plastic mass after mixing may be removed from the mixing machine and repeatedly passed between relatively widely spaced apart pressure rolls, such as are used in the rubber industry, until the mass has reached a state, which may be described as stiffly-plastic or leather-like, due to the evaporation of a part of the accompanying solvent (xylene) and in which condition it is best suited for the application thereto of high shearing stresses.

In applying high shearing stresses to the stiffly-plastic mass incorporating the ethyl cellulose, plasticizer, carbon black pigment and calcium palmitate dispersing agent, it is again passed between a pair of pressure rolls (which may be the same as those employed in the massing of the ingredients) set tightly together so that the plastic mass issues from between the rolls in the form of a thin sheet of from about 1/16 to 1/32 inch in thickness. The rolls are driven at different speeds in order to subject the mass to exceptionally high shearing stresses and may be heated or cooled to maintain the proper temperature and consistency of the mass. The sheet of material issuing from the rolls may be passed through the rolls over and over again until a thorough, uniform and permanent colloidal dispersion of the pigment in the ethyl cellulose is assured.

Finally the pigmented sheets issuing from the rolls are allowed to cool at which time they will be sufficiently brittle to permit them to be broken into chips or flaky fragments of paper-like thinness. Such chips may then be packaged for shipment or sold in bulk to the trade. Or the chips may be formed into a solution or paste by dissolving in a suitable solvent.

Thus the solid pigmented cellulose ether serves as an intermediate product for the preparation of paints, varnishes, enamels or lacquers possessing excellent physical qualities such as a high lustre, stability, depth of tone and durability. Such coating compositions are prepared by dissolving the pigmented base, either alone or with other ingredients, in a suitable liquid vehicle with which it is compatible and an advantageous characteristic of the base is that it is compatible with many of the more common paint, lacquer and enamel vehicles so as to render it useful as a general pigmenting agent.

The formula given under Example I lends itself to variation without materially altering the nature of the product. For example, linseed oil fatty-acids may be substituted for the dibutyl phthalate in substantially the same proportion, and other common solvent plasticizers, such as tricresyl phosphate and the other phthalic acid esters, may be incorporated with or substituted for the dibutyl phthalate or linseed oil fatty-acids provided such agents are compatible with the ethyl cellulose. Likewise other solvents and swelling agents for the cellulose ether, such as toluene, may be used in place of, or in combination with, the xylene mentioned in the above example. A hydrogenated petroleum hydrocarbon derivative sold under the trade name of "Solvesso" is especially suitable for this purpose. The solvents and plasticizers are preferably so chosen that they are solvents for the metal salt used as the dispersing agent.

As has before been stated, pigments other than carbon black may advantageously be used in the production of the pigmented base. The following Example II is directed to the preparation of a concentrated blue pigmented base:

Example II

| | Parts by weight |
|---|---|
| Ethyl cellulose (18 centipoises) | 100 |
| Prussian blue | 100 |
| Linseed oil fatty acids | 10 |
| Barium oleate | 5 |
| Xylene | 39 |

The ethyl cellulose as indicated in Examples I and II is of the low-viscosity type, although viscosity is not a critical factor. Suitable plasticizers other than dibutyl phthalate and linseed oil fatty-acids may be employed provided they are compatible with the ethyl cellulose. Other suggested pigments that may be substituted for the Prussian blue in the above formula (together with their parts by weight indicated in parentheses) are: Chrome green (300), titanium dioxide (250) and maroon lake (100).

In place of ethyl cellulose, I have found that other cellulose ethers may be advantageously employed for the manufacture of the pigmented base. In the following Example III, benzyl cellulose is employed as the base and strontium oleate as the dispersing agent:

Example III

| | Parts by weight |
|---|---|
| Benzyl cellulose—low viscosity | 140 |
| Carbon black | 70 |
| Strontium oleate | 7 |
| Dibutyl phthalate | 14 |
| Xylene | 60 |

In the preparation of liquid coating compositions from the pigmented bases represented by the formulas of Examples I, II or III, the base is mixed with a suitable volatile solvent for the cellulose ether dispersing medium. In ordinary practice the cellulose ether pigmented base will be combined with other vehicles such as oils, natural and synthetic resins and cellulose derivatives in which the cellulose ether is compatible, or with mixtures of such vehicles. In the production of pigmented coating preparations—paints, varnishes, lacquers, enamels, etc.—the pigmented cellulose ether chip is preferably dissolved in an equal part, by weight, of a thinner such as a mixture of 80 percent xylene and 20 percent of a high or medium "boiling" acetate or alcohol (for example, butyl acetate, amyl acetate, or butanol) and this solution will be added to the clear varnish vehicles to be pigmented.

A typical example follows of an alkyd-resin coating composition adapted to be produced from the pigmented bases described above:

Example IV (a)

| | Parts by weight |
|---|---|
| Phenol and oil modified glycerol phthalate resin (solid) | 100.0 |
| Xylene | 100.0 |

(b)

| | |
|---|---|
| Ethyl cellulose pigmented chip (Example II) | 16.0 |
| Xylene | 115.0 |
| Butanol | 29.0 |

(c)

Drier solution _____ 4.2

The mixture (a) composed of the equal parts of the alkyl resin and xylene is added to the mixture (b) composed of the ethyl cellulose pigmented chip dissolved in the xylene-butanol mixture, and the drier (c) is then introduced into the resulting mixture which is thoroughly agitated for the purpose of obtained an enamel of homogeneous characteristics.

The phenol and oil modified glycerol phthalate resin in the above Example IV may be of the type sold under the name "Beckosol #1", although other synthetic resins, such as that sold under the name "Beckosol #18", a long-oil alkyd resin having an acid number of 15, can be substituted for the alkyd resin.

The proportion of drier solution in the formula of the above Example IV can be considerably varied, according to whether a low bake, high bake or air dry finish is desired.

One suitable composition of the drier solution included in Example IV may be as follows:

*Example V*

| | Parts by weight |
|---|---|
| Lead naphthenate in mineral spirits (34% metal) | 40.0 |
| Cobalt naphthenate in mineral spirits (6% metal) | 5.6 |
| Manganese lineoleate (8.2% metal) | 20.6 |
| Xylene | 33.8 |

The cellulose ester pigmented base is suitable for pigmenting resin-oil varnish compositions such as "Vinsol" resin (polymerized and oxidized abietic acid and terpenes) incorporated with China-wood oil, ester-gum modified resin "Teglac Z 152" incorporated with boiled linseed oil, "Bakelite", "BR 254" or "BR 820" (phenol formaldehyde resin) incorporated with a mixture of China-wood oil and bodied linseed oil, "Phenac 615 N" (ester gum modified phenol formaldehyde) incorporated with China-wood oil, and a mixture of "Bakelite 254" and "Teglac 15" incorporated with a mixture of China-wood oil and bodied linseed oil. It is also suitable for pigmenting cellulose derivative lacquers, such as those of nitrocellulose.

While the invention is particularly directed to the pigmenting of ethyl cellulose in the presence of an organic salt of calcium, barium or strontium of the long-chain aliphatic acids, the invention in its broader aspect contemplates the pigmenting of other common cellulose ethers, such as methyl cellulose, butyl cellulose, benzyl cellulose and glycol cellulose which, while not as effective as ethyl cellulose, nevertheless are suitable for the production of coating compositions of improved quality, characterized by higher gloss, greater depth of color, increased stability and general compatibility.

As has been pointed out above, the two-step mode of mechanically dispersing a pigment within a dispersing medium disclosed by the Wiegand patent above referred to is excellently suited to the production of cellulose ether pigmented bases in accordance with my invention. However, it is to be understood that the invention is not limited to any specific mode of mechanical manipulation, and other modes of effecting the dispersion of the pigment in the cellulose ether pigmenting medium may be employed without departing from the spirit of my invention.

I claim:

1. A pigmented cellulose ether base comprising a pigment uniformly massed and mechanically worked with a cellulose ether, a plasticizer and a long chain fatty acid salt of a metal of the group consisting of calcium, barium and strontium, which salt serves as a dispersing agent which is soluble in the plastic cellulose ether mass.

2. A carbon black pigmented cellulose ether base comprising a ground intermixture of carbon black with a plasticized cellulose ether and a barium soap dispersing agent soluble in the cellulose ether mass.

3. A carbon black pigmented ethyl cellulose base comprising carbon black uniformly massed and mechanically worked with ethyl cellulose, a plasticizer, and about 10 percent of barium oleate based on the weight of the carbon black, said barium oleate serving as a dispersing agent.

4. A color pigmented ethyl cellulose base comprising a color pigment uniformly massed and mechanically worked with ethyl cellulose, a plasticizer and barium oleate serving as a dispersing agent.

5. A carbon black pigmented benzyl cellulose base comprising carbon black colloidally dispersed with benzyl cellulose, a plasticizer and strontium oleate serving as a dispersing agent.

6. A pigmented cellulose ether base comprising a pigment uniformly massed and mechanically worked with a cellulose ether, a plasticizer and a soap of a metal of the group consisting of calcium, barium and strontium, which soap serves as a dispersing agent which is soluble in the plastic cellulose ether mass.

7. A carbon black pigmented cellulose ether base comprising a ground intermixture of carbon black with a plasticized cellulose ether and barium oleate serving as a dispersing agent.

8. A carbon black pigmented cellulose ether base comprising a ground intermixture of carbon black with a plasticized cellulose ether and a strontium soap dispersing agent soluble in the cellulose ether mass.

ROBERT LOUIS ZAPP.